United States Patent
Kohn

(10) Patent No.: US 10,722,761 B2
(45) Date of Patent: Jul. 28, 2020

(54) BALL RETRIEVAL APPARATUS AND SYSTEM

(71) Applicant: TOP SERVE TENNIS PTY LTD, Chatswood, New South Wales (AU)

(72) Inventor: Ron Kohn, Chatswood (AU)

(73) Assignee: TOP SERVE TENNIS PTY LTD, New South Wales (AU)

( * ) Notice: Subject to any disclaimer, the term of this patent is extended or adjusted under 35 U.S.C. 154(b) by 0 days.

(21) Appl. No.: 16/492,741

(22) PCT Filed: Mar. 12, 2018

(86) PCT No.: PCT/AU2018/050224
§ 371 (c)(1),
(2) Date: Sep. 10, 2019

(87) PCT Pub. No.: WO2018/161129
PCT Pub. Date: Sep. 13, 2018

(65) Prior Publication Data
US 2020/0070013 A1 Mar. 5, 2020

(30) Foreign Application Priority Data
Mar. 10, 2017 (AU) .................. 2017900847

(51) Int. Cl.
*A63B 47/02* (2006.01)
(52) U.S. Cl.
CPC .......... *A63B 47/02* (2013.01); *A63B 2210/50* (2013.01)
(58) Field of Classification Search
CPC .................................... A63B 47/02

USPC ................ 294/19.2, 179; 56/400.11, 400.21; 473/386; 119/161
See application file for complete search history.

(56) References Cited

U.S. PATENT DOCUMENTS

| 3,149,872 A | * | 9/1964 | Ward | A63B 47/02 |
| | | | | 294/19.2 |
| 3,371,950 A | * | 3/1968 | Stap | A63B 47/02 |
| | | | | 294/15 |
| 3,889,996 A | | 6/1975 | Campbell | |
| 3,926,465 A | | 12/1975 | Hoagland et al. | |
| 4,193,625 A | * | 3/1980 | Nelson | A63B 47/02 |
| | | | | 294/19.2 |

(Continued)

FOREIGN PATENT DOCUMENTS

| AT | 386530 B | 9/1988 |
| CN | 202263358 U | 6/2012 |

*Primary Examiner* — Paul T Chin
(74) *Attorney, Agent, or Firm* — Leason Ellis LLP

(57) ABSTRACT

A ball retrieval apparatus (10, 910) for retrieving (e.g. tennis) balls (70) from the ground (72) includes a receptacle (12, 912) with an opening (26, 926) over which horizontal rods (36, 936) extend. The rods are received in apertures (34), and can move upwardly and laterally between lowermost and raised positions. The distance between rods in their lowermost positions is less than the ball's diameter. This distance increases as the rods are raised, and moved in opposite lateral directions. A ball can be retrieved by being received into the receptacle between adjacent rods. The rods then drop down to their lowermost positions so that the distance between them again decreases so that the ball is trapped in the receptacle. The invention also extends to a ball retrieval system including a trolley (46, 946) and one or two ball retrieval apparatus supported on the trolley.

19 Claims, 5 Drawing Sheets

(56) References Cited

U.S. PATENT DOCUMENTS

| | | | | | |
|---|---|---|---|---|---|
| 4,412,697 | A | * | 11/1983 | Verde | A63B 47/02 |
| | | | | | 294/19.2 |
| 4,461,504 | A | * | 7/1984 | Perez | A63B 47/02 |
| | | | | | 248/132 |
| 4,596,413 | A | * | 6/1986 | La Porte | E01H 1/12 |
| | | | | | 294/159 |
| 5,301,991 | A | | 4/1994 | Chen et al. | |
| 5,464,262 | A | * | 11/1995 | Madrazo | A63B 47/02 |
| | | | | | 294/19.2 |
| 6,142,544 | A | * | 11/2000 | Benzoni | A63B 47/02 |
| | | | | | 294/19.2 |
| 6,302,460 | B1 | * | 10/2001 | Carr | A63B 47/02 |
| | | | | | 294/19.2 |
| 6,354,643 | B1 | * | 3/2002 | Podejko | A63B 47/02 |
| | | | | | 280/47.34 |
| 6,412,839 | B1 | * | 7/2002 | Tran | A63B 47/02 |
| | | | | | 16/44 |
| 6,612,453 | B2 | | 9/2003 | Joo-Tai | |
| 6,945,578 | B2 | * | 9/2005 | Hellerson | A63B 47/02 |
| | | | | | 294/19.2 |
| 8,328,254 | B1 | * | 12/2012 | Zats | A63B 47/02 |
| | | | | | 294/19.2 |

* cited by examiner

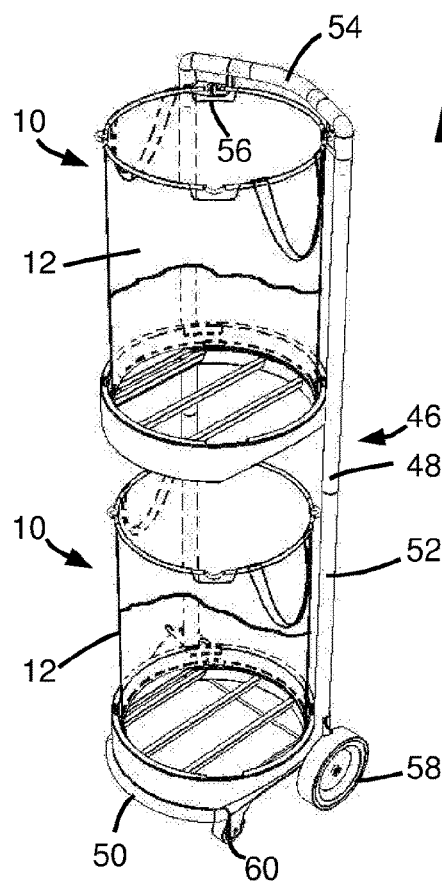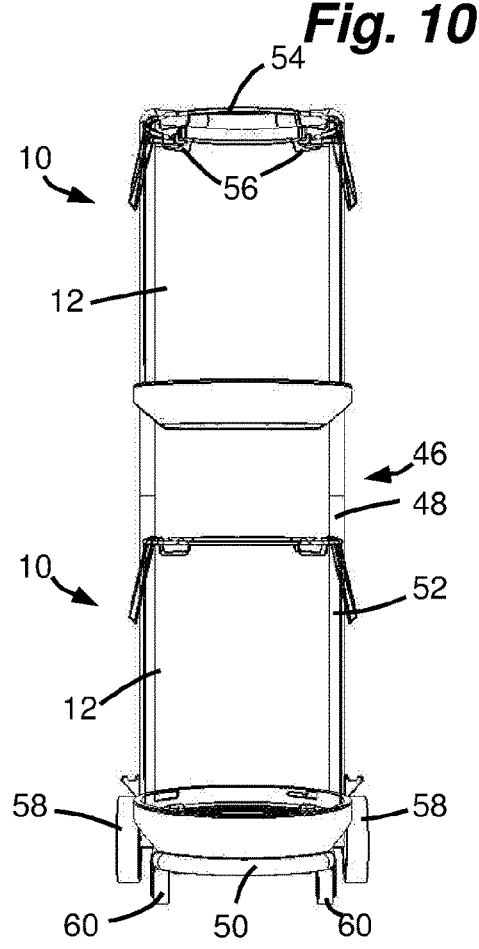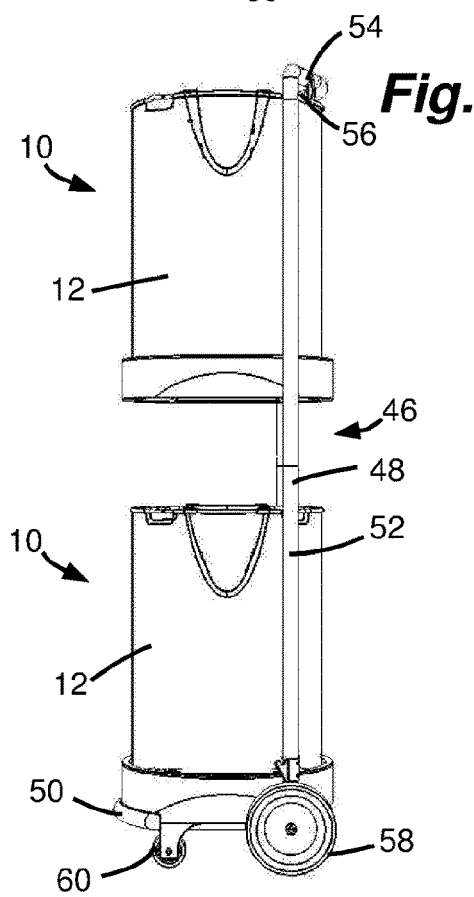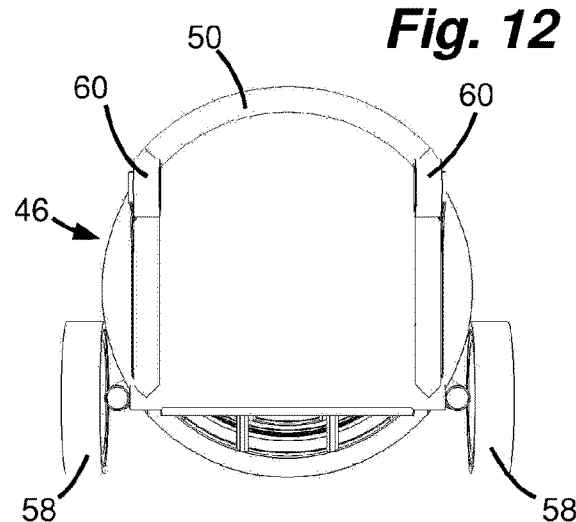

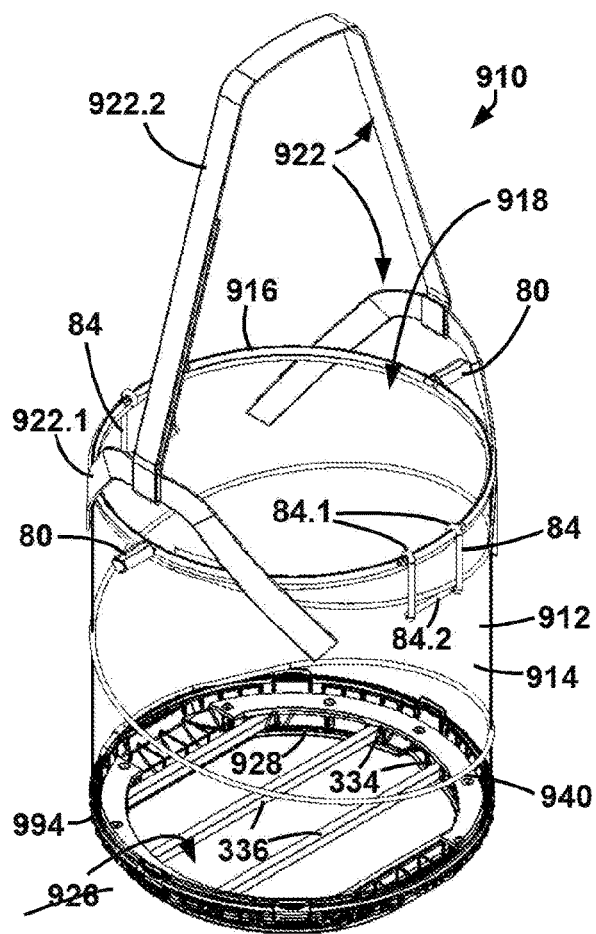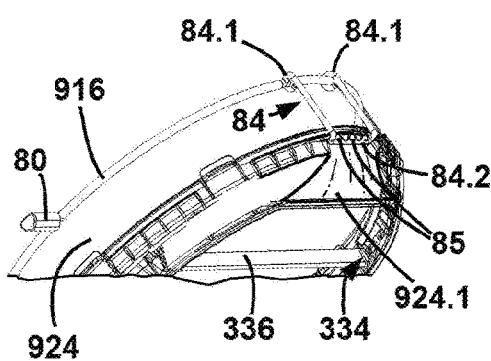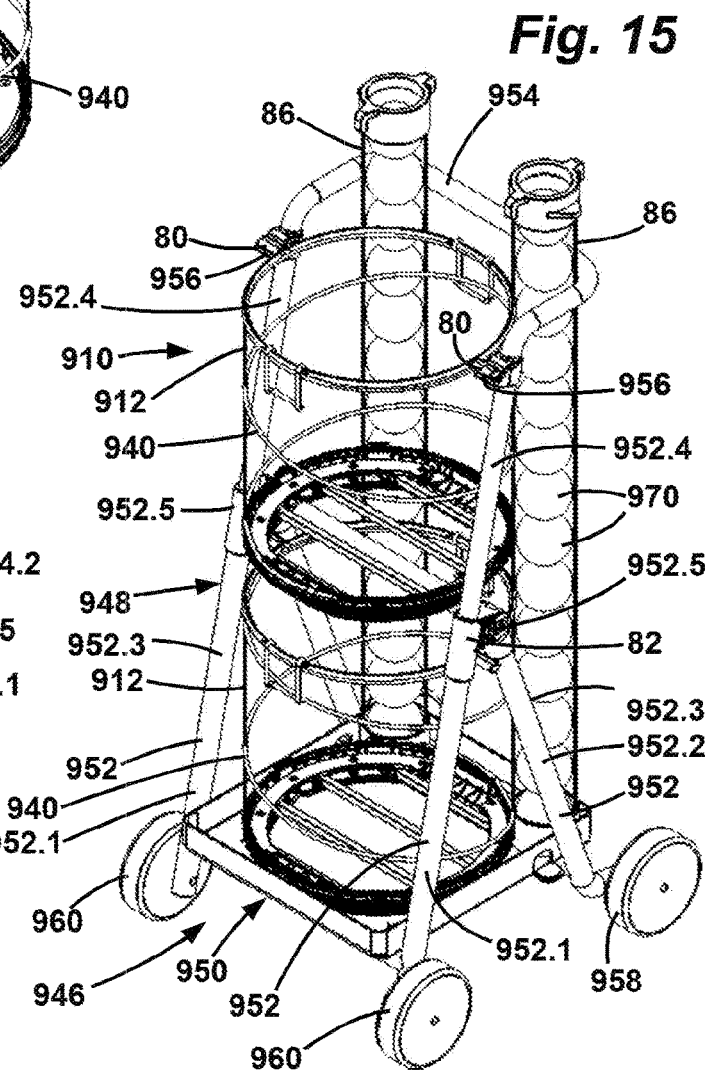

BALL RETRIEVAL APPARATUS AND SYSTEM

CROSS-REFERENCE TO RELATED APPLICATIONS

This application is a U.S. National Stage Application under 35 U.S.C. § 371 of International Patent Application No. PCT/AU2018/050224, filed Mar. 12, 2018 which claims priority to Australian Patent Application No. 2017900847, filed Mar. 10, 2017, the contents of which are each hereby incorporated by reference in their respective entireties.

FIELD OF THE INVENTION

The present invention relates to an apparatus for retrieving balls such as tennis balls from a ground surface and for holding the balls, and to a ball retrieval system which includes a trolley and one of more such apparatus.

BACKGROUND TO THE INVENTION

During the playing of the game of tennis, or during tennis coaching activities, it is common for many tennis balls to be left on the ground. Picking up such balls by hand can necessitate repeatedly bending down to pick up the balls, in order to place them in a bag, basket, or other container for reuse later on. This is labour intensive and inconvenient, and can place strain on the back of a person picking up balls in this manner.

Known ball retrieval devices make use of metal baskets with lower bars with spaces between the bars. Such a basket is forced onto a tennis ball, so that the ball is squeezed between the bars before popping through the bars into the basket. This involves compression of the ball and necessitates deformation of the bars. After repeated use, this can result in damage to the ball and, depending on the type of basket, even wearing and breakage of the basket. In addition, the need to apply force to urge the ball into the basket is inconvenient.

Another disadvantage of such known baskets is the space taken up by them, as this limits the number of baskets that can be transported from one location to another. For example, in a case where there are two baskets present, but all of the balls available can be stowed in one of the baskets while the other basket remains empty, the full volume of space required to accommodate both baskets is needed even though one of the baskets is unused.

It is an object of the present invention to overcome or ameliorate one or more disadvantage of the prior art or to provide a useful alternative thereto.

SUMMARY OF THE INVENTION

According to a first aspect of the invention there is provided a ball retrieval apparatus for retrieving a ball having a ball diameter, the apparatus having an apparatus weight and an upright operational orientation and including:
a ball receptacle having a lower end when the apparatus is in the operational orientation, and a receptacle opening at the lower end;
a first receptacle portion adjacent to the lower end defining a pair of rod retention apertures;
an elongate rigid rod extending in a rod longitudinal direction, across the receptacle opening at an acute angle relative to the horizontal when the apparatus is in the operational orientation, and having two opposite rod ends, each of the rod ends being received in a respective one of the rod retention apertures, wherein each rod retention aperture is oversized relative to the respective rod end received in that aperture such that the rod is free to move from a lowermost first position relative to each of the rod retention apertures, upwardly relative to the ball receptacle and laterally relative to the rod longitudinal direction, to a raised second position, while the rod ends remain in the respective rod apertures;
wherein the rod has at least one upper corner edge that extends longitudinally relative to the rod, the corner edge being adapted to engage the ball immediately on entry of the ball into the receptacle;
wherein the rod is disposed at a first distance from an opposing portion of the apparatus such that a space is defined between the rod and said opposing portion,
wherein the first distance is less than said ball diameter when the rod is in its first position and is at least as big as said ball diameter when the rod is in its second position,
wherein the apparatus weight is sufficient to enable the apparatus to be lowered onto the ball such that the ball can move the rod from the first position towards the second position to enable the ball to pass between the rod and said opposed portion of the apparatus, into the receptacle without deformation of the rod or compression of the ball.

In a preferred embodiment of the invention, the rod extends horizontally in said rod longitudinal direction.

In a preferred embodiment of the invention, the rod has at least one lower face facing transversely relative to the rod, and extending longitudinally relative to the rod, the at least one face being at an acute angle relative to the horizontal when the apparatus is in its operational orientation, so as to be adapted to facilitate said upward and lateral movement of the rod by engagement of the ball with the face.

Preferably, the rod has two said lower faces.

Preferably, the or each lower face is flat.

Preferably, the rod has an upper flat face extending longitudinally relative to the rod, wherein one of said lower faces intersects said upper face at a first intersection which constitutes one said corner edge, and the other of said lower faces intersects said upper face at a second intersection spaced from said first intersection, the second intersection constituting another said corner edge, such that in a transverse section of the rod, said upper face and lower faces are in at least a partial triangular configuration relative to one another.

In a preferred embodiment of the invention, each rod retention aperture is of substantially the same shape as the shape of a transverse section of the rod.

In a preferred embodiment of the invention the apparatus includes a plurality of said rods and the first receptacle portion defines a respective pair of rod retention apertures for each rod, wherein each rod constitutes, with respect to the or each adjacent rod, a said opposing portion of the apparatus, and wherein said distance between each rod and the or each adjacent rod is less than said ball diameter when the adjacent rods are in their respective first positions and is at least as big as said ball diameter when the adjacent rods are in their respective second positions.

In a preferred embodiment of the invention, the receptacle is moveable between an erected condition and a collapsed condition.

Then, preferably, the receptacle has side walling and is moveable from the erected condition to the collapsed condition by means of the walling being collapsible.

Preferably, the apparatus includes a resilient biasing component adapted to exert an urging force to urge the receptacle towards the erected condition, the biasing component being adapted to enable the receptacle to be moved from the erected condition to the collapsed condition by the applying of a force to the receptacle to overcome the urging force.

Preferably, the biasing component includes a spiral spring traversing at least part of the walling from a first location along the walling to a second location which, when the apparatus is in its erected condition and in its operational orientation, is higher than the first location.

Preferably, the apparatus includes a releasable locking component for releasably locking the receptacle in its collapsed condition.

Preferably, the receptacle includes at least one hook engagement formation at or adjacent to an upper extremity of the receptacle.

According to a second aspect of the invention there is provided a ball retrieval system including:
- a trolley having trolley wheels and at least one apparatus engagement portion; and
- a ball retrieval apparatus according to the first aspect of the invention or preferred embodiments thereof,
- wherein the ball retrieval apparatus includes at least one trolley engagement formation adapted to releasably engage the at least one apparatus engagement portion such that the ball retrieval apparatus is supported on the trolley.

In a preferred embodiment of the invention, the trolley includes a lower support which constitutes at least part of said at least one apparatus engagement portion, wherein the ball retrieval apparatus is adapted to be supported by the trolley by being supported on the lower support.

In a preferred embodiment of the invention, the trolley includes at least one hook formation which constitutes at least part of said at least one apparatus engagement portion, and the ball retrieval apparatus includes at least one trolley engagement formation, wherein the ball retrieval apparatus is adapted to be supported by the trolley by means of the at least one trolley engagement formation engaging the at least one hook formation.

In a preferred embodiment of the invention, the ball retrieval system includes two said ball retrieval apparatuses, wherein trolley is adapted to simultaneously support the ball retrieval apparatuses one above the other, so that the upper one of the ball retrieval apparatuses is adapted to constitute a ball basket.

In a preferred embodiment of the invention, the trolley is moveable between a trolley erected condition and a trolley folded condition.

BRIEF DESCRIPTION OF THE DRAWINGS

Preferred embodiments of the invention will now be described, by way of example only, with reference to the accompanying drawings in which:

FIG. 9 is a perspective, partly cut-away view, of the trolley and ball retrieval apparatuses of FIG. 5;

FIG. 10 is a perspective view, from the front, of the trolley and ball retrieval apparatuses of FIG. 9;

FIG. 11 is a side view of the trolley and ball retrieval apparatuses of FIG. 9;

FIG. 12 is a bottom view of the trolley and ball retrieval apparatuses of FIG. 9;

FIG. 13 is a schematic, perspective view of a ball retrieval apparatus in accordance with another embodiment of the invention;

FIG. 14 is a partial schematic, perspective view of the ball retrieval apparatus of FIG. 13, with its receptacle in a collapsed condition;

FIG. 15 is a schematic, perspective view of two ball retrieval apparatuses according to FIG. 13, supported on a trolley according to a different embodiment to that of FIG. 5;

FIG. 19 is a schematic, perspective view of a part of the ball retrieval apparatus of FIG. 13 viewed in the direction of the arrow XIX in FIG. 14.

DETAILED DESCRIPTION

Figure 1:
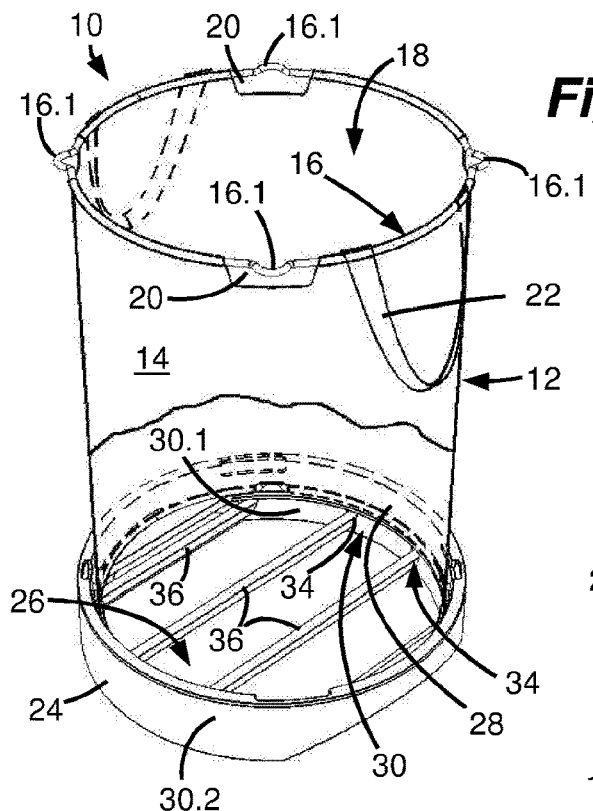
FIG. 1 is a schematic, partly cut-away perspective view, from above and to the side, of a ball retrieval apparatus in accordance with an embodiment of the invention.
Figure 2:
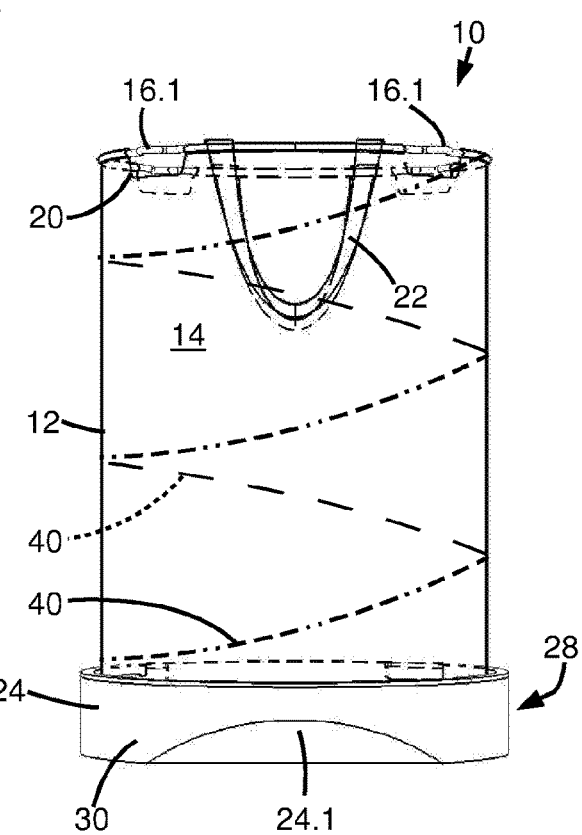
FIG. 2 is a perspective view, from the side, of the ball retrieval apparatus of FIG. 1.
Figure 3:
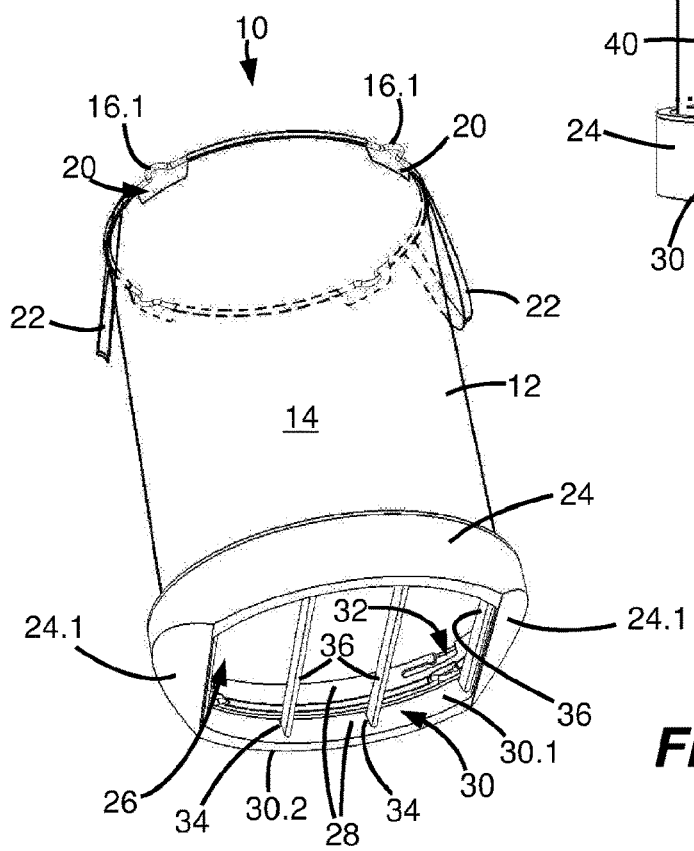
FIG. 3 is a perspective view from below and to the side, of the ball retrieval apparatus of FIG. 1.
Figure 4:
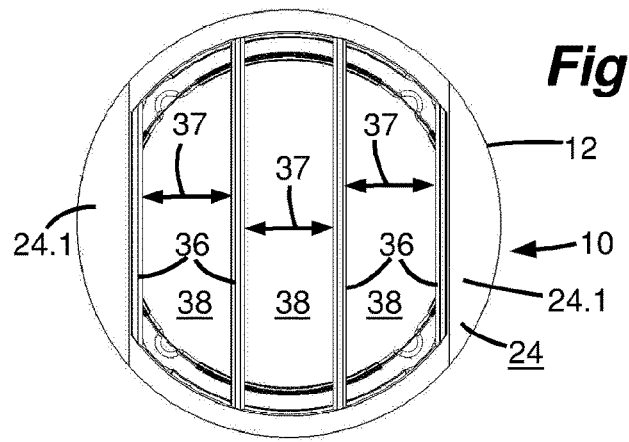
FIG. 4 is a bottom of view of the ball retrieval apparatus of FIG. 1.
Figure 5:
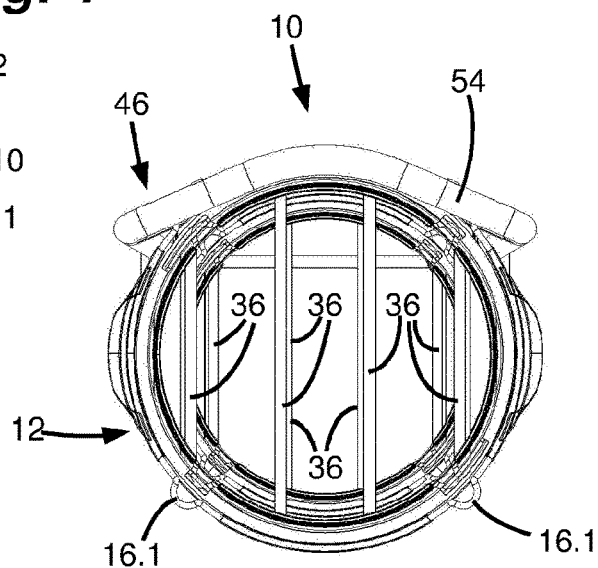
FIG. 5 is a top view of two ball retrieval apparatuses according to FIG. 1, one above the other, supported on a trolley according to an embodiment of the invention.

Referring to the drawings, there is shown a ball retrieval apparatus 10, which includes a receptacle 12. The receptacle 12 has an upright operational position as best seen, for example, in FIG. 2.

The receptacle 12 has fabric walling 14 in the shape of a cylinder. A rim-forming, metal upper frame 16 extends around the perimeter of the walling 14 at its upper extremity, in a hem formed by the walling. The frame 16 (and hem in which it is disposed) constitutes a rim which defines an upper opening 18 to the receptacle 12.

The upper frame 16 has a number of outwardly curved formations 16.1, which protrude through gaps 20 defined in the walling 14.

Attached to the fabric walling 14 are fabric receptacle handles 22 that can be used to lift the receptacle 12.

The receptacle 12 further includes a base component 24. The base component 24 includes a frame portion 28, which in turn includes a double wall 30, having an inner wall portion 30.1 and an outer wall portion 30.2.

The base component 24 defines a lower opening 26 to the receptacle 12.

The frame portion 28 defines L-shaped engagements slots 32 which are adapted for receiving the curved formations 16.1 of the upper frame 16, as described in more detail below.

The inner wall portion 30.1 defines a series of substantially triangular apertures 34 on opposing sides of the receptacle 12. The number of apertures 34 is the same on the two opposing sides so that each aperture on one side has a corresponding aperture on the opposing side, these two apertures constituting a pair of apertures.

A series of rigid rods 36 extends across the base assembly 24, with ends of each of the rods being received in respective apertures 34 of a pair of opposing apertures. The rods 36 extend horizontally or close to horizontally (or at least at a narrow acute angle relative to the horizontal), when the receptacle 12 is in its upright operational position.

Figure 6:
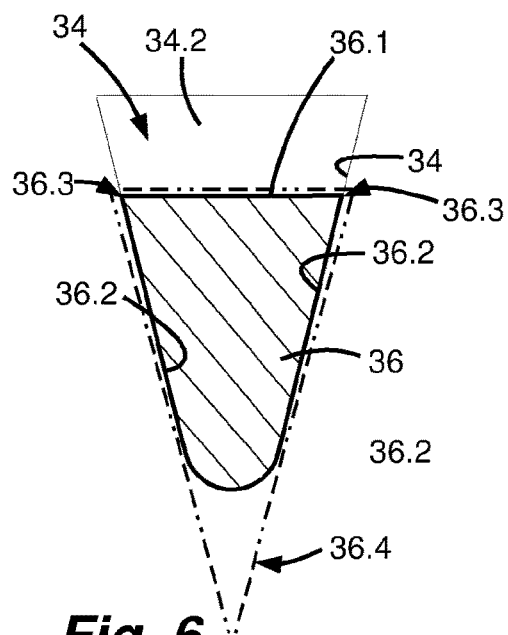
FIG. 6 is an enlarged view of a rod of the ball retrieval apparatus of FIG. 1, protruding into an aperture in a wall of the ball retrieval apparatus, with the rod in a lowermost position in the aperture.
Figure 7:
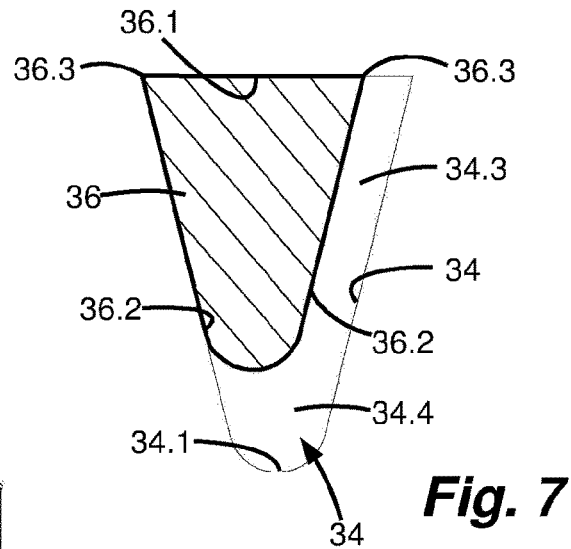
FIG. 7 is an enlarged view, similar to that of FIG. 6, but with the rod in an uppermost, and laterally displaced, position relative to the aperture.

As best seen in FIGS. 6 and 7, each rod 36 has an upper face 36.1 extending along the length of the rod, and two lower faces 36.2, also extending along the length of the rod, and which face downwards and outwards relative to the rod. The upper face 36.1 intersects each of the lower faces 36.2 at a respective corner edge 36.3. As can be seen in FIG. 6, the configuration of the upper face 36.1 and lower faces 36.2 when the rod 36 is viewed in transverse cross-section is such that those faces form part of an imaginary triangular shape 36.4 indicated in dashed lines (oversized relative to the rod, to facilitate visibility of the features in FIG. 6).

The rods are 36 spaced apart from one another by distances 37, so as to define spaces 38 between each pair of successive rods (adjacent rods).

As can best be seen in FIGS. 6 and 7, the cross-sectional shape of each of the rods 36 is the same as the shape of each of the apertures 34, although the area covered by the cross-sectional shape of each of the rods 36 is smaller than the area of each of the apertures 34.

Because of the corresponding shapes of the apertures 34 and rods 36, when an end of a rod is accommodated within an aperture, the rod can be positioned in a first position at the lower extremity 34.1 of the aperture, as seen in FIG. 6.

As can be seen in FIGS. 6 and 7, the lower extremities 34.1 of the apertures are rounded as are the lower extremities of the cross-sectional shapes of the rods 36. Therefore, when in their first, lowermost positions as shown in FIG. 6, the rods 36 conform exactly to the lower portions of the apertures 34, with a portion 34.2 of each aperture not being filled by the respective rod, and thus constituting an open space.

Because of this configuration of each of the rods 36 and apertures 34, each rod is movable within the corresponding apertures, from its first position as shown in FIG. 6 to a raised, second position as shown in FIG. 7. In the second position shown in FIG. 7, the rod 36 is not only raised, but is also laterally displaced, relative to its first position as shown in FIG. 6. In this second position, the rod 36 conforms to the upper left portion of the aperture 34 as shown in FIG. 7. In this position of the rod 36, the right hand and lower portions 34.3 and 34.4 respectively, of the aperture 34, which are not filled by the rod, constitute open spaces.

Just as the rod 36 can be at the upper left portion of the aperture 34 as shown in FIG. 7, it can alternatively be in its second position at the upper right portion of the aperture.

As a result of this capability of the rods 36 to move relative to the rod apertures 34 and hence relative to the receptacles 12, it will be understood that two successive (adjacent) rods can be lifted in this manner, and moved laterally in opposite directions to each other, so as to increase the distance 37 between those two rods.

The receptacle 12 is collapsible as described further below, but is provided with at least one biasing element to keep the receptacle in an erected condition as shown. According to one preferred embodiment, the biasing element includes a length of spring metal 40 which is attached to the fabric walling 14 and arranged in a spiral configuration as shown in dashed lines in FIG. 2. While the biasing element 40 urges the receptacle 12 into the erected condition, it also allows the receptacle to be collapsed by means of a force applied, preferably by hand, to the top of the walling 14.

According to an embodiment of the invention, there is further provided a trolley 46, which is adapted for facilitating the movement, from one location to another, of one or more apparatuses 10.

The trolley 46 includes a trolley frame 48, which in turn includes a lower frame portion 50, frame uprights 52, and a frame handle portion 54.

A pair of hooks 56 is provided, and, in the present embodiment, is attached to the handle portion 54, as can best be seen in FIG. 9.

Attached to the lower frame portion 50 is a pair of rear wheels 58 and a pair of front wheels 60.

Figure 8:
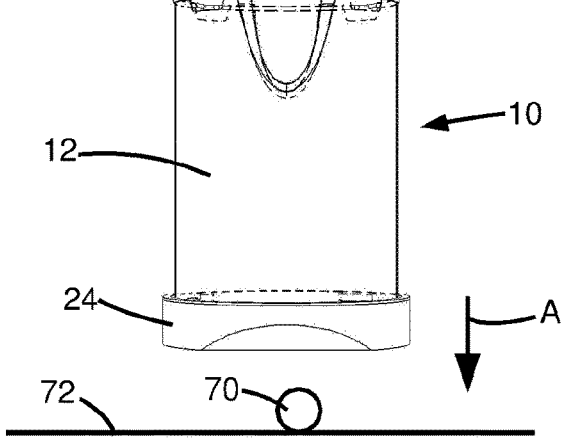
FIG. 8 is a perspective view from the side, of the ball retrieval apparatus of FIG. 1, positioned over a ball resting on a ground surface.

The retrieval apparatus 10 can be used to retrieve a ball 70 such as a tennis ball, from a ground surface 72 on which the ball is resting as indicated, by way of example, in FIG. 8. The rods 36 are freely movable within the apertures 34 as described above. Thus, when the apparatus 10 is placed over the ball 70, such that the ball engages with two adjacent rods 36, part of the ball protrudes into the space 38 between those two rods, so as to engage with the lower faces 36.2 as the distance 37 between the rods, when they are in their respective first positions as described, is less than the diameter of the ball.

The apparatus 10 can then be lowered on the ball 70, in the direction of the arrow A in FIG. 8, until the apparatus engages the ground surface 72. When the apparatus 10 engages, and is allowed to rest on, the ground surface 72, the apparatus is in its upright operational orientation.

Because of the downward, outward angles of the faces 36.2 of the rods 36, as the apparatus 10 is lowered in this manner, the ball 70 forces the rods upwards and laterally relative to the apertures 34 into which those rods extend, and apart from each other. In this process, the rods 36 are moved towards their respective second positions as described above, but in opposite lateral directions.

In this manner, the distance 37 between the two rods 36 increases until it is at least as big as the diameter of the ball 70. The ball 70 then passes between the rods 36 into the receptacle 12. Once the outermost parts of the ball 70 move past the rods 36, the ball no longer urges the rods upwards, and the rods drop under the effect of gravity to their first positions as illustrated in FIG. 6.

As the rods 36 drop, they once again move towards each other thus reducing the distance 37 between them, thereby preventing the ball 70 from falling through the space 38. The ball 70 is thus retained in the receptacle 12. The retaining of the ball 70 in the receptacle 12 is facilitated by engagement of the corner edge 36.3 of each of the two adjacent rods 36, with the ball. This is at least because these corner edges 36.3, due to being relatively sharp in shape, can dig into, and firmly engage the balls.

The weight of the apparatus 10 is such that simply lowering it under its own weight onto a ball 70 as described above is sufficient to cause the ball to displace the rods 36 such that the ball passes into the receptacle 12, without additional force having to be applied to the apparatus.

Because of the freedom of the rods 36 to move, and the fact that the distance 37 becomes at least as large as the diameter of the ball 70, the movement of the ball into the receptacle 12 does not require any compression of the ball or deformation of the rods.

In this manner, multiple balls 70 can be retrieved using the apparatus 10, so that the balls enter the receptacle 12, simply by placing the apparatus 10 on the balls, and lowering the apparatus, to allow the balls to pass the relevant rods 36. This process can be carried out in relation to a single ball 70 or multiple balls, at a time or successively, which are guided into suitable positions by the rods 36. If it is desired to carry out this process with a greater number of balls, in order to position the balls appropriately relative to the rods 36, it may be necessary to move the apparatus 10 around on the balls until the balls are suitably aligned with the spaces 38.

The base component 24 is provided with chamfers 24.1 for assisting to deflect balls 70 that might otherwise become trapped under the apparatus 10 as it is lowered onto the balls, and which might prevent the apparatus from being fully lowered.

Once a ball 70 (or more than one ball) has been captured by the receptacle 12 as described, the ball can be extracted from the receptacle, by simply removing it from the opening 18 at the top of the receptacle.

The receptacle 12 can be collapsed for storage or transport, by applying a force to the top of the walling 14 as mentioned above. Once the walling 14 has been collapsed in this manner, the curved formations 16.1 can be inserted into the L-shaped engagement slots 32 and the walling can then be twisted to lock the curved formations in place, bayonet fashion, in the slots. This ability of the receptacle 12 to collapse can be advantageous in situations where a number of apparatuses 10 need to be transported from one location to another, as once collapsed, they require far less volume of space.

According to the embodiment shown, two apparatuses 10 can be supported on the trolley 46. One apparatus 10 can be placed on the lower trolley frame portion 50, as that lower portion is shaped as to be complementary to, or at least appropriately dimensioned to accommodate, the base assembly 24.

Another apparatus 10 can be a supported on the trolley 46 by hooking two of the curved portions 16.1 of the upper frame of the receptacle 12 on the hooks 56 of the trolley.

One or two apparatuses 10, supported on the trolley 46 as described, can be moved from place to place by moving the trolley on its wheels 58, 60. This is especially useful after the apparatus 10 (or two apparatuses if applicable) has been used to retrieve a large number of balls which are retained in the receptacle 12 thereby adding to its weight.

To move the trolley 46 around, it can be tilted back by pulling on the frame handle portions 54, so that the trolley rests only on its rear wheels 58.

However, the presence of the front wheels 60 enables the trolley 46 to be parked at a particular location by returning it to its upright, non-tilted position so that it rests on both the rear wheels 58 and front wheels 60. Even in this orientation, it can be moved on the two sets of wheels 58, 60.

As a result of the ability to position the upper apparatus 10 at a raised position relative to the ground surface 72 on the trolley 46, the apparatus can be used as a ball basket. The ability to move the trolley 46 on its front and rear wheels 60, 58 enables the apparatus, when being used as a ball basket, to be positioned as desired by a user.

In addition, where the upper apparatus 10 is being used as a ball basket, the ability to position it at a raised position on the trolley 46 also means that it can be at an ergonomically suitable height to minimise or avoid the need for a person, such as a tennis coach, to repeatedly bend over to retrieve balls from the ball basket.

Referring to FIGS. 13 to 18, there is shown a ball retrieval apparatus 910 and trolley 946, according to different embodiments to those shown in FIGS. 1 to 12.

In FIGS. 13 to 18, parts corresponding to parts in FIGS. 1 to 12 are referenced with the same reference numbers as in those earlier figures, but with the prefix "9". Thus, for example, the component referenced "26" in the description pertaining to FIGS. 1 to 12 has a corresponding component or feature referenced "926" in the description pertaining to FIGS. 13 to 18.

Conversely, in FIGS. 13 to 18, each component referenced by a reference number beginning with "9" where that number is followed by a number corresponding to a reference number in FIGS. 1 to 12, corresponds to the component in FIGS. 1 to 12 to which that corresponding reference number relates.

The manner of operation of the ball retrieval apparatus 910 in relation to retrieving balls is the same as that described with reference to FIGS. 1 to 12, including the operation of the rods 936 relative to the apertures 934, and the manner of retrieving a ball 970.

The receptacle 912 of the ball retrieval apparatus 910 can be collapsed in a similar manner to that described in relation to the ball retrieval apparatus 10 above. However, in order to lock the receptacle 912 in its collapsed condition, instead of inserting curved formations of the upper metal frame 916 into L-shaped engagement slots in the frame portion 928, there are provided locking elements 84. The locking elements 84 have rotation portions 84.1 which are curved to as connect the locking elements to the metal frame 916 such that the locking elements can be rotated relative to that frame.

The locking elements 84 further have hooking portions 84.2 which are adapted to releasably hook onto lower edges of the base component 924 of the receptacle 912 when the receptacle is in its collapsed condition as shown in FIG. 14 (in which the fabric walling 914 and spring metal 940 are not shown).

Thus, when the receptacle 912 is forced into a collapsed condition in a similar manner to that described above in relation to the receptacle 12, the locking elements 84 can be rotated relative to the metal frame 916 and hooked onto the base component 924.

In particular, when the locking elements 84 are rotated in this manner, the hooking portions 84.2 are adapted to hook onto downwardly projecting studs 85 near the bottom of the base component 924 as shown in FIG. 19.

When it is desired to move the receptacle 912 to its erected condition, the locking elements 84 can be rotated in an opposite direction relative to the metal frame 916 and unhooked from the base component 924.

The fabric receptacle handles 922 of the ball retrieval apparatus 910 include side portions 922.1 secured to the receptacle 912, and a connection portion 922.2 joined to and interconnecting the side portions 922.1.

Figure 16:
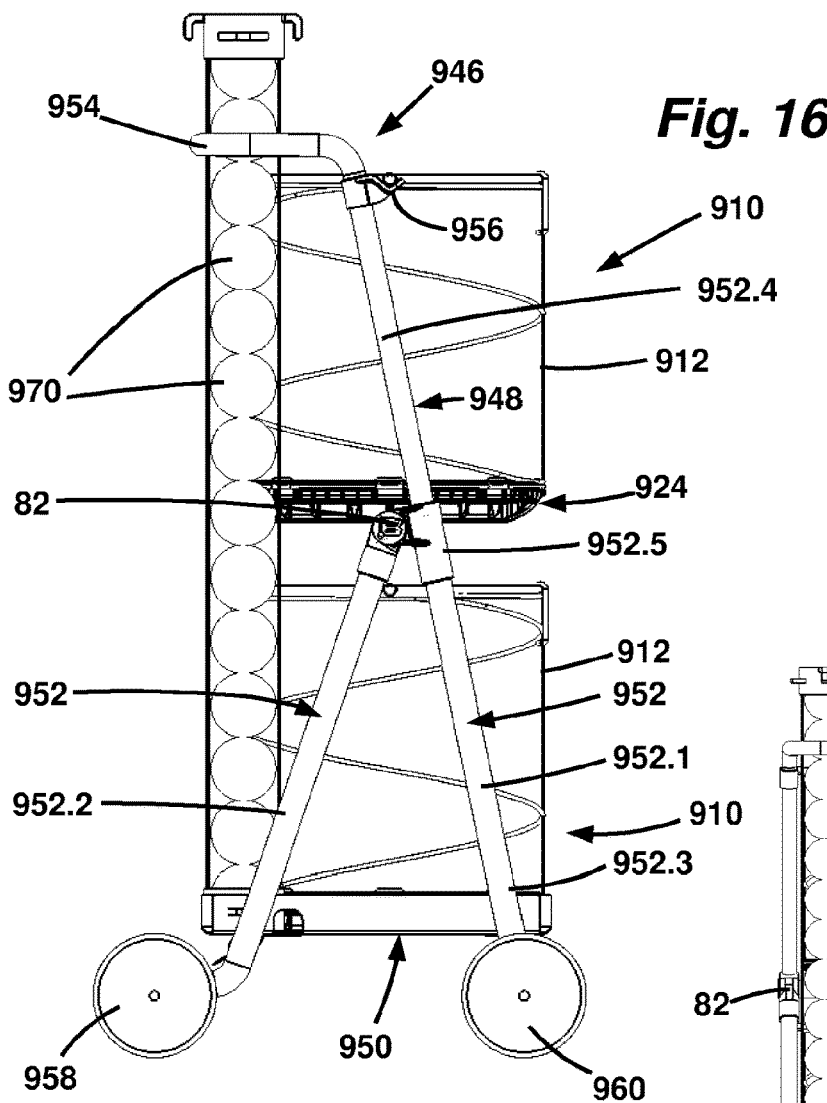
FIG. 16 is a schematic, side view of the ball retrieval apparatus and trolley of FIG. 15.
Figure 17:
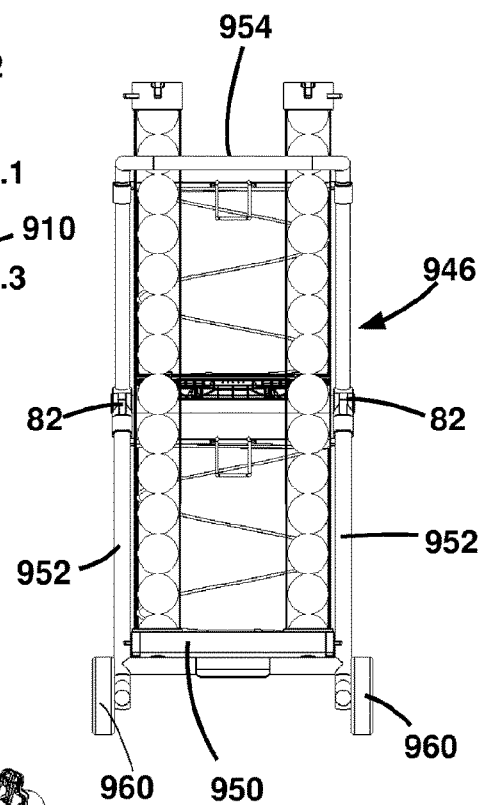
FIG. 17 is a schematic, front view of the ball retrieval apparatus and trolley of FIG. 15.

Instead of the ball retrieval apparatus 910 being adapted to be supported on the trolley 946 by means of curved portions of the upper frame 916 being hooked on the hooks 956 (as was done with the curved portions 16.1 of the apparatus 10 in relation to the hooks 56), there are provided trunnion formations 80 which are adapted to be seated on, and supported by, the hooks 956. Where two ball retrieval apparatuses 910 are supported on the trolley 946 as shown in FIGS. 15, 16 and 17, the upper apparatus is supported in this manner, while the lower apparatus is supported on the lower trolley frame portion 950.

The frame uprights 952 include front frame uprights 952.1 and rear frame uprights 952.2.

The front frame uprights 952.1 have lower frame portions 952.3 and upper frame portions 952.4, where the upper portions are adapted to slide telescopically into the lower portions. For each front upright 952.1, a lock 952.5 is provided for locking the upper and lower portions 952.4, 952.3 in position relative to each other, for example in the extended position as shown in FIGS. 15, 16 and 17, and the retracted position as shown in FIG. 18.

The front frame uprights 952.1 and rear frame uprights 952.2 on each side of the trolley 946 are connected to each other by hinge connections 82. The hinge connections 82 enable the front and rear frame uprights 952.1, 952.2 to rotate relative to each other between the relative position as shown in FIGS. 15, 16 and 17 and the relative position as shown in FIG. 18.

Figure 18:
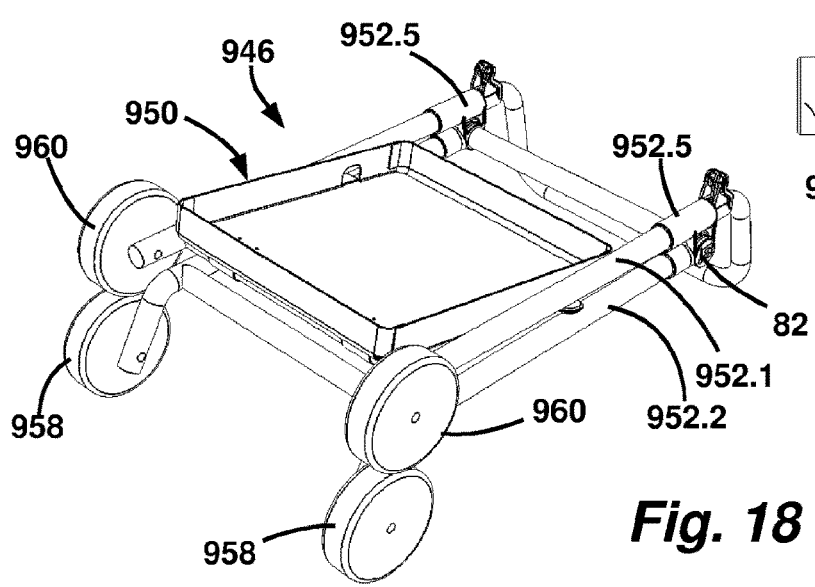
FIG. 18 is a schematic, perspective view of the trolley of FIG. 15, in a folded condition.

Such relative rotation together with telescopically sliding the upper frame portions 952.4 into the lower frame portions 952.3 can be effected to move the trolley from its erected condition shown in FIGS. 15, 16 and 17 to the collapsed condition as shown in FIG. 18.

The trolley 946, when in its erected condition, is adapted to be moved from place to place on both its rear and front wheels 958, 960.

Upright ball tubes 86 are provided for storing balls as shown in FIGS. 14, 15 and 16. This can be useful especially when the receptacle 912 (or receptacles if there are two supported on the trolley 946) become full. These ball tubes 86 simply rest on positioning guides (not shown) on the lower frame portion 250 and can easily be removed.

Although the invention has been described with reference to one or more specific embodiment above, it is not limited to those embodiments but may be embodied on other forms as would be understood by a person skilled in the art.

The invention claimed is:

1. A ball retrieval apparatus for retrieving a ball having a ball diameter, the apparatus having an apparatus weight and an upright operational orientation, comprising:
 a ball receptacle having a lower end when the apparatus is in the operational orientation, and a receptacle opening at the lower end;
 a first receptacle portion adjacent to the lower end defining a pair of rod retention apertures; and
 an elongate rigid rod extending in a rod longitudinal direction, across the receptacle opening at an acute angle relative to the horizontal when the apparatus is in the operational orientation, and having two opposite rod ends, each of the rod ends being received in a respective one of the rod retention apertures, wherein each rod retention aperture is oversized relative to the respective rod end received in that aperture such that the rod is free to move from a lowermost first position relative to each of the rod retention apertures, upwardly relative to the ball receptacle and laterally relative to the rod longitudinal direction, to a raised second position, while the rod ends remain in the respective rod apertures,
 wherein the rod has at least one upper corner edge that extends longitudinally relative to the rod, the corner edge being adapted to engage the ball immediately on entry of the ball into the receptacle,
 wherein the rod is disposed at a first distance from an opposing portion of the apparatus such that a space is defined between the rod and said opposing portion,
 wherein the first distance is less than said ball diameter when the rod is in its first position and is at least as big as said ball diameter when the rod is in its second position, and
 wherein the apparatus weight is sufficient to enable the apparatus to be lowered onto the ball such that the ball can move the rod from the first position towards the second position to enable the ball to pass between the rod and said opposed portion of the apparatus, into the receptacle without deformation of the rod or compression of the ball.

2. A ball retrieval apparatus according to claim 1, wherein the rod extends horizontally in said rod longitudinal direction.

3. A ball retrieval apparatus according to claim 1, wherein the rod has at least one lower face facing transversely relative to the rod and extending longitudinally relative to the rod, the at least one lower face being at an acute angle relative to the horizontal when the apparatus is in its operational orientation, so as to be adapted to facilitate said upward and lateral movement of the rod by engagement of the ball with the at least one lower face.

4. A ball retrieval apparatus according to claim 3, wherein the rod has two said lower faces.

5. A ball retrieval apparatus according to claim 4, wherein the or each lower face is flat.

6. A ball retrieval apparatus according to claim 5, wherein the rod has an upper flat face extending longitudinally relative to the rod, wherein one of said lower faces intersects said upper face at a first intersection which constitutes one said corner edge, and the other of said lower faces intersects said upper face at a second intersection spaced from said first intersection, the second intersection constituting another said corner edge, such that in a transverse section of the rod, said upper face and lower faces are in at least a partial triangular configuration relative to one another.

7. A ball retrieval apparatus according to claim 1, wherein each rod retention aperture is of substantially the same shape as the shape of a transverse section of the rod.

8. A ball retrieval apparatus according to claim 1, further comprising a plurality of said rods and wherein the first receptacle portion defines a respective pair of rod retention apertures for each rod, wherein each rod constitutes, with respect to the or each adjacent rod, a said opposing portion of the apparatus, and wherein said distance between each rod and the or each adjacent rod is less than said ball diameter when the adjacent rods are in their respective first positions and is at least as big as said ball diameter when the adjacent rods are in their respective second positions.

9. A ball retrieval apparatus according to claim 1, wherein the receptacle is moveable between an erected condition and a collapsed condition.

10. A ball retrieval apparatus according claim 9, wherein the receptacle has collapsible side walling and is moveable from the erected condition to the collapsed condition.

11. A ball retrieval apparatus according claim 10, further comprising a resilient biasing component adapted to exert an urging force to urge the receptacle towards the erected condition, the biasing component being adapted to enable the receptacle to be moved from the erected condition to the collapsed condition by the applying of a force to the receptacle to overcome the urging force.

12. A ball retrieval apparatus according claim 11, wherein the biasing component includes a spiral spring traversing at least part of the walling from a first location along the walling to a second location which, when the apparatus is in its erected condition and in its operational orientation, is higher than the first location.

13. A ball retrieval apparatus according to claim 9, further comprising a releasable locking component for releasably locking the receptacle in its collapsed condition.

14. A ball retrieval apparatus according to claim 1, wherein the receptacle includes at least one trolley engagement formation at or adjacent to an upper extremity of the receptacle.

15. A ball retrieval system including:
a trolley having trolley wheels and at least one apparatus engagement portion; and
a ball retrieval apparatus, for retrieving a ball having a ball diameter, the apparatus having an apparatus weight and an upright operational orientation and including:
 a ball receptacle having a lower end when the apparatus is in the operational orientation, and a receptacle opening at the lower end;
 a first receptacle portion adjacent to the lower end defining a pair of rod retention apertures; and
 an elongate rigid rod extending in a rod longitudinal direction, across the receptacle opening at an acute angle relative to the horizontal when the apparatus is in the operational orientation, and having two opposite rod ends, each of the rod ends being received in a respective one of the rod retention apertures, wherein each rod retention aperture is oversized relative to the respective rod end received in that aperture such that the rod is free to move from a lowermost first position relative to each of the rod retention apertures, upwardly relative to the ball receptacle and laterally relative to the rod longitudinal direction, to a raised second position, while the rod ends remain received in the respective rod apertures,
 wherein the rod has at least one upper corner edge that extends longitudinally relative to the rod, the corner edge being adapted to engage the ball immediately on entry of the ball into the receptacle,
 wherein the rod being disposed at a first distance from an opposing portion of the apparatus such that a space is defined between the rod and said opposing portion,
 wherein the first distance is less than said ball diameter when the rod is in its first position and is at least as big as said ball diameter when the rod is in its second position,
 wherein the apparatus weight is sufficient to enable the apparatus to be lowered onto the ball such that the ball can move the rod from the first position towards the second position to enable the ball to pass between the rod and said opposed portion of the apparatus, into the receptacle without deformation of the rod or compression of the ball, and
 wherein the ball retrieval apparatus includes at least one trolley engagement formation adapted to releasably engage the at least one apparatus engagement portion such that the ball retrieval apparatus is supported on the trolley.

16. A ball retrieval system according to claim 15, wherein the trolley includes a lower support which constitutes at least part of said at least one apparatus engagement portion, wherein the ball retrieval apparatus is adapted to be supported by the trolley by being supported on the lower support.

17. A ball retrieval system according to claim 15, wherein the trolley includes at least one hook formation which constitutes at least part of said at least one apparatus engagement portion, and the ball retrieval apparatus includes at least one trolley engagement formation, wherein the ball retrieval apparatus is adapted to be supported by the trolley by means of the at least one trolley engagement formation engaging the at least one hook formation.

18. A ball retrieval system according to claim 15, further comprising two said ball retrieval apparatuses, wherein the trolley is adapted to simultaneously support the ball retrieval apparatuses one above the other, so that the upper one of the ball retrieval apparatuses is adapted to constitute a ball basket.

19. A ball retrieval system according to claim 15, wherein the trolley is moveable between a trolley erected condition and a trolley folded condition.

* * * * *